United States Patent
Fujisawa et al.

(10) Patent No.: US 12,521,532 B2
(45) Date of Patent: Jan. 13, 2026

(54) BALLOON BODY FOR CATHETER AND BALLOON CATHETER

(71) Applicant: GOODMAN CO., LTD., Nagoya (JP)

(72) Inventors: Soichiro Fujisawa, Seto (JP); Mitsuhiro Ota, Seto (JP); Mitsumasa Okamoto, Seto (JP); Sinsuke Hiratsuka, Seto (JP)

(73) Assignee: GOODMAN CO., LTD., Nagoya (JP)

( * ) Notice: Subject to any disclaimer, the term of this patent is extended or adjusted under 35 U.S.C. 154(b) by 130 days.

(21) Appl. No.: 18/393,474

(22) Filed: Dec. 21, 2023

(65) Prior Publication Data
US 2024/0123199 A1 Apr. 18, 2024

Related U.S. Application Data

(63) Continuation of application No. PCT/JP2022/021096, filed on May 23, 2022.

(30) Foreign Application Priority Data

Jun. 22, 2021 (JP) ................................ 2021-103066

(51) Int. Cl.
*A61M 25/10* (2013.01)

(52) U.S. Cl.
CPC . *A61M 25/1002* (2013.01); *A61M 2025/1004* (2013.01); *A61M 2025/1086* (2013.01)

(58) Field of Classification Search
CPC ...... A61M 25/1002; A61M 2025/1004; A61M 2025/1086; A61M 25/104; A61M 2025/109; A61B 17/22
See application file for complete search history.

(56) References Cited

U.S. PATENT DOCUMENTS 8,845,581 B2    9/2014  Holman et al.
2002/0151924 A1*  10/2002  Shiber .................. A61B 8/12
                                                                 606/194
(Continued)

FOREIGN PATENT DOCUMENTS

JP      2003-000708 A    1/2003
JP      2006-512952 A    4/2006
(Continued)

OTHER PUBLICATIONS

Jul. 26, 2022—International Search Report—Intl App PCT/JP2022/021096.

*Primary Examiner* — Andrew Restaino
(74) *Attorney, Agent, or Firm* — Banner & Witcoff, Ltd.

(57) ABSTRACT

A balloon body for a catheter includes a balloon and a plurality of hard members. The balloon includes a plurality of rigid portions has at least a joining portion provided with each of the plurality of hard members. The plurality of flexible portions is arranged between the plurality of rigid portions in a circumferential direction. In a cross section, at least a portion of each portion protruding outward with respect to the balloon, of the plurality of hard members provided on the balloon in the deflated state, is arranged in a virtual closed region. The virtual closed region is formed when an end portion in the circumferential direction of each of the plurality of rigid portions is joined to an end portion in the circumferential direction of another rigid portion adjacent in the circumferential direction.

10 Claims, 21 Drawing Sheets

(56) References Cited

U.S. PATENT DOCUMENTS

| | | | | |
|---|---|---|---|---|
| 2003/0153870 | A1* | 8/2003 | Meyer | A61M 25/104 |
| | | | | 604/96.01 |
| 2004/0133223 | A1 | 7/2004 | Weber | |
| 2005/0137617 | A1* | 6/2005 | Kelley | A61B 17/320725 |
| | | | | 604/103.14 |
| 2005/0149082 | A1* | 7/2005 | Yee | A61B 17/320725 |
| | | | | 606/159 |
| 2006/0015134 | A1* | 1/2006 | Trinidad | A61M 25/1002 |
| | | | | 604/103.08 |
| 2006/0247674 | A1* | 11/2006 | Roman | A61B 17/320725 |
| | | | | 606/192 |
| 2008/0114294 | A1 | 5/2008 | Holman et al. | |
| 2022/0184353 | A1* | 6/2022 | Koga | A61M 25/1002 |

FOREIGN PATENT DOCUMENTS

| | | |
|---|---|---|
| JP | 2008-506454 A | 3/2008 |
| JP | 5466008 B2 | 4/2014 |
| WO | 2020-195697 A1 | 10/2020 |

* cited by examiner

BALLOON BODY FOR CATHETER AND BALLOON CATHETER

REFERENCE TO RELATED APPLICATIONS

This application is a Continuation Applications of International Application No. PCT/JP2022/021096, filed May 23, 2022, which claims priority from Japanese Patent Application No. 2021-103066, filed on Jun. 22, 2021. This disclosure of the foregoing application is hereby incorporated by reference in its entirety.

BACKGROUND ART

To improve the possibility of a balloon catheter through a blood vessel, it is preferable that the diameter of the balloon in a deflated state be as small as possible. Therefore, techniques have been proposed to reduce the diameter of the balloon in the deflated state.

A balloon catheter that is provided with hard members for acting on a lesion within a blood vessel is known. With this kind of balloon catheter, the hard members may protrude outward when the balloon is deflated, which may inhibit the diameter from being reduced.

SUMMARY

The present disclosure aims to provide a balloon body for a catheter whose diameter can be reduced when deflated even when hard members are provided, and a balloon catheter provided with the balloon body for the catheter.

A balloon body for a catheter according to a first aspect of the present disclosure is provided with a balloon configured to change shape between a deflated state and an inflated state, and a plurality of hard members which are positioned on a side surface of the balloon and protrude outward. The balloon has a plurality of rigid portions and a plurality of flexible portions. The plurality of rigid portions includes at least a joining portion provided with each of the plurality of hard members. The plurality of flexible portions is arranged between the plurality of rigid portions in a circumferential direction and a rigidity of the plurality of flexible portions is smaller than that of the plurality of rigid portions. The balloon changes shape such that each of the plurality of hard members moves in a direction away from a predetermined reference axis when the balloon switches from the deflated state to the inflated state, and changes shape such that each of the plurality of hard members moves in a direction closer to the reference axis when the balloon switches from the inflated state to the deflated state. The plurality of hard members is harder than the plurality of flexible portions of the balloon. In a cross section orthogonal to the reference axis, at least a portion of each portion protruding outward with respect to the balloon, of the plurality of hard members provided on the balloon in the deflated state, is arranged in a virtual closed region. The virtual closed region is formed when an end portion in the circumferential direction of each of the plurality of rigid portions is joined to an end portion in the circumferential direction of another rigid portion adjacent in the circumferential direction. The reference axis being arranged at a center of the virtual closed region.

With the balloon body for a catheter according to the first aspect, the diameter in the deflated state can be smaller than the diameter in the state in which the plurality of rigid portions is arranged along the virtual closed region. Therefore, with the balloon body for a catheter, the diameter in the deflated state can be reduced even when the plurality of hard members is provided on the balloon.

A balloon catheter according to a second aspect of the present disclosure is provided with the balloon body for a catheter according to the first aspect, and a long member extending along the reference axis, which is inserted through the balloon. When the balloon is in the deflated state, each of the plurality of rigid portions contacts the long member. According to this second aspect, the balloon catheter can minimize the diameter of the balloon body for a catheter in the deflated state.

BRIEF DESCRIPTION OF DRAWINGS

Embodiments will be described below in detail with reference to the accompanying drawings in which.

DESCRIPTION

One embodiment of a balloon catheter 1 (1A, 1B) according to the present disclosure will now be described with reference to the accompanying drawings. The referenced drawings are used to describe technical features that can be employed in the present disclosure. The described configuration and the like of the device is not intended to be limited thereto and is merely an example for explanation purposes. The balloon catheter 1 can dilate a stenotic lesion formed in a blood vessel, or apply hard member 6 (first embodiment) or 7 (second embodiment), to be described later, to a lesion to crush or incise said lesion.

First Embodiment (Balloon Catheter 1A)

The balloon catheter 1A according to a first embodiment will now be described with reference to FIG. 1 to FIG. 6C. The balloon catheter 1A has a catheter shaft 2 and a balloon body 10A.

Catheter Shaft 2

Figure 1:
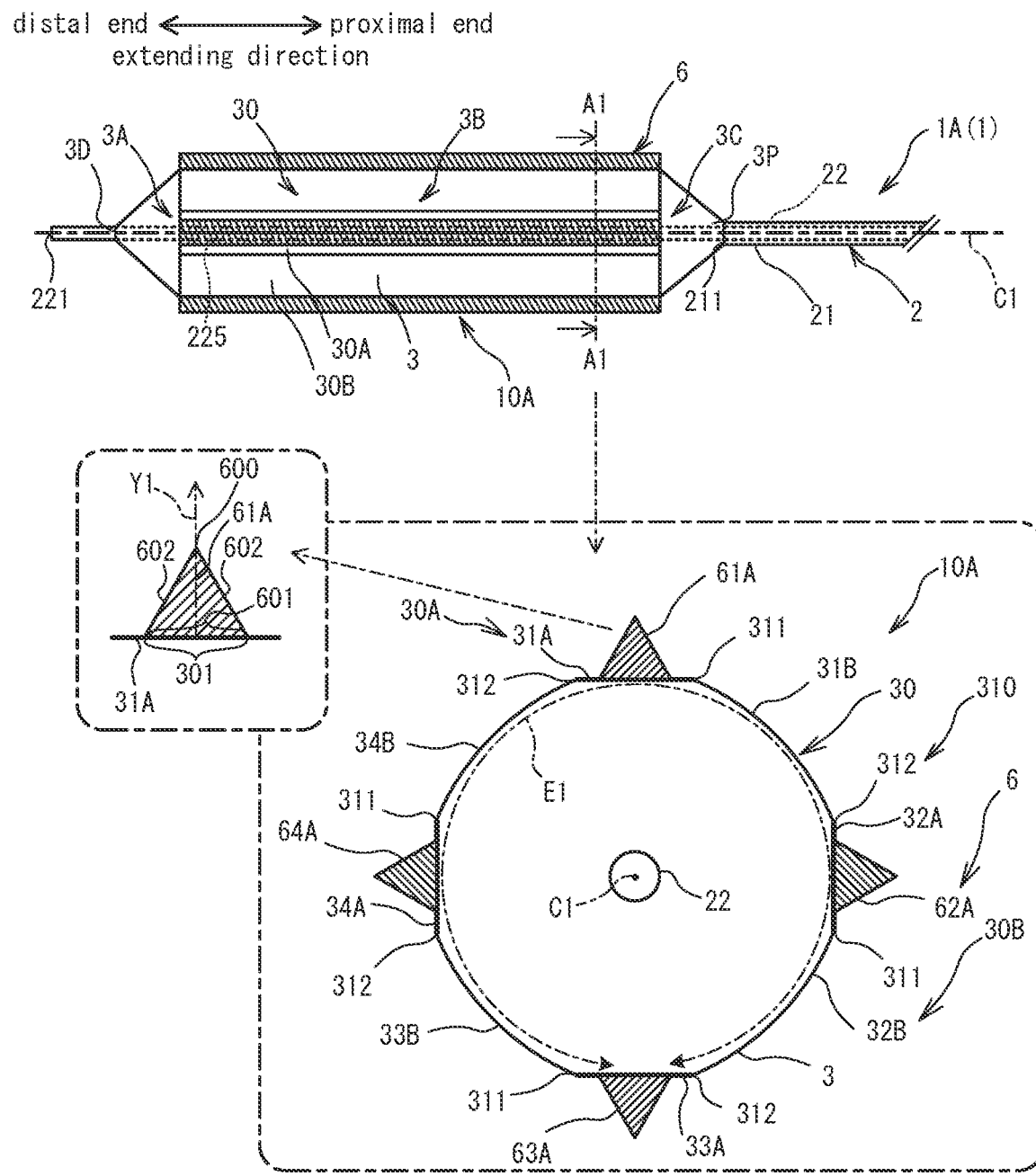
FIG. 1 is a view of a balloon catheter including a balloon in an inflated state.
Figure 3:
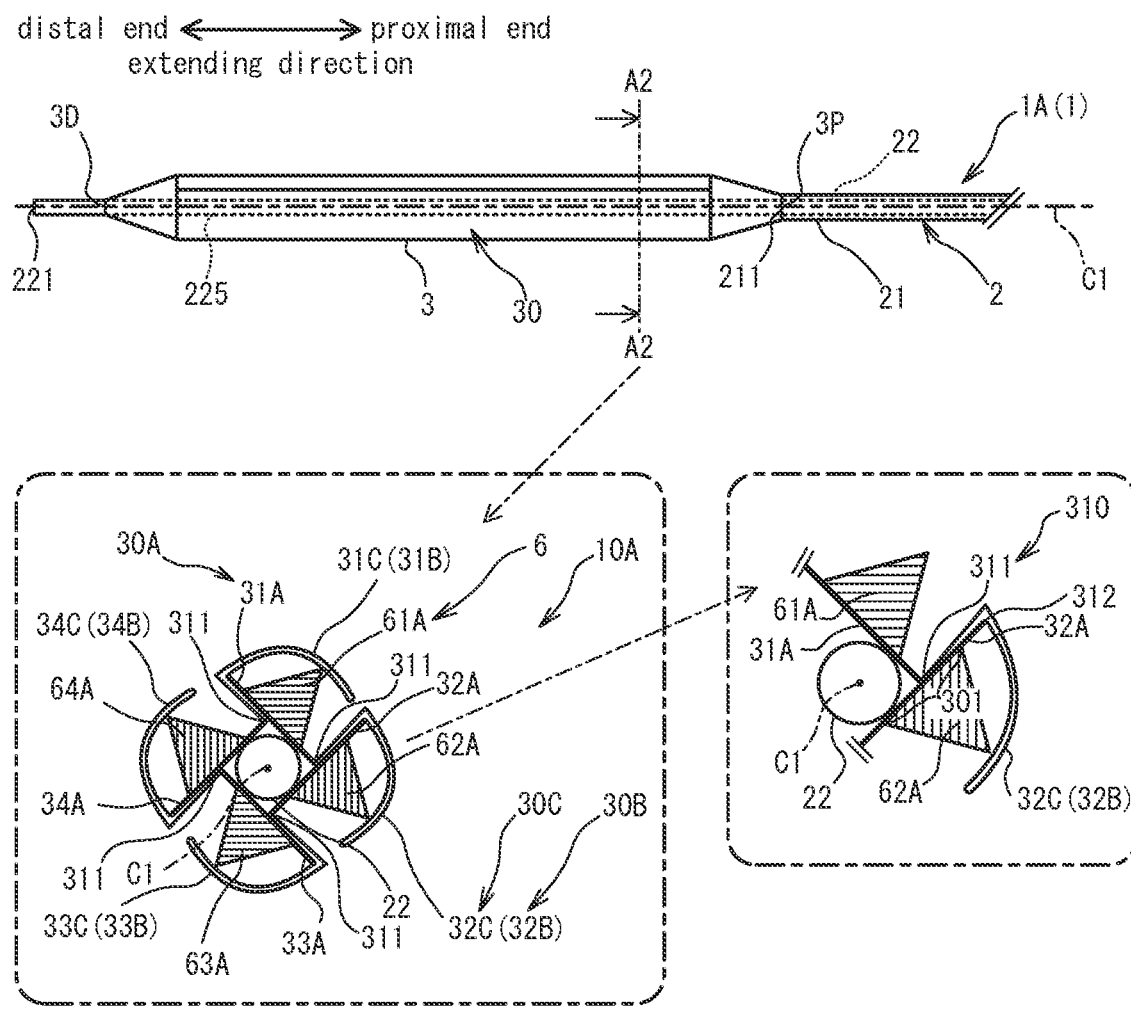
FIG. 3 is a view of the balloon catheter including the balloon in a deflated state.

As shown in FIG. 1 and FIG. 3, the balloon body 10A is connected to an end portion on one side of the tube-shaped catheter shaft 2. The balloon catheter 1A is used in a state in which a hub, not shown in the drawings, is connected to an end portion on the other side of the catheter shaft 2. The hub can supply compressed fluid to a balloon 3 (described later) of the balloon body 10A via the catheter shaft 2.

The one side from among both ends of the catheter shaft 2 will be referred to as a distal end side. The other side from among both ends of the catheter shaft 2 will be referred to as a proximal end side. A direction extending along the catheter shaft 2 will be referred to as an extending direction. An axis passing through a center of the catheter shaft 2 and extending in the extending direction will be referred to as a reference axis C1. In a cross section cut on a plane perpendicular to the reference axis C1 (simply referred to as a cross section), a side closer to the reference axis C1 in a radial direction centered on the reference axis C1 will be referred to as an inner side, and a side further away from the reference axis C1 will be referred to as an outer side.

The catheter shaft 2 has an outer tube 21 and an inner tube 22. The outer tube 21 and the inner tube 22 are both flexible. An inside diameter of the outer tube 21 is larger than an outside diameter of the inner tube 22. Other than a predetermined portion on the distal end side, the inner tube 22 is disposed inside a lumen of the outer tube 21. The predetermined portion on the distal end side of the inner tube 22 protrudes toward the distal end side from an end (hereinafter referred to as distal end 211) on the distal end side of the outer tube 21. An end on the distal end side of the inner tube 22 (hereinafter referred to as distal end 221) is disposed farther toward the distal end side than the distal end 211 of the outer tube 21. The predetermined portion on the distal end side of the inner tube 22 will be referred to as protruding portion 225. The material of the outer tube 21 and the inner tube 22 is not particularly limited. A polyamide resin may be used as an example of the material of the outer tube 21 and the inner tube 22.

The compressed fluid supplied from the hub flows through a space of the lumen of the outer tube 21 other than a lumen of the inner tube 22. A guide wire that is not shown in the drawings is inserted through the lumen of the inner tube 22.

Balloon Body 10A

The balloon body 10A has a balloon 3 and a hard member 6. The balloon can change shape between a deflated state and an inflated state according to whether the compressed fluid is supplied from the hub not shown in the drawings. FIG. 1 shows the balloon 3 in the inflated state, and FIG. 3 shows the balloon 3 in the deflated state. The hard member 6 is fixed to the balloon 3.

Balloon 3

An end on the distal end side of the balloon 3 (hereinafter referred to as the distal end 3D) is connected by thermal welding to near the distal end 221 of the protruding portion 225 of the inner tube 22. Also, an end on the proximal end side of the balloon 3 (hereinafter referred to as the proximal end 3P) is connected by thermal welding to near the distal end 211 of the outer tube 21. The balloon 3 covers the protruding portion 225 of the inner tube 22 from the outside. The material of the balloon 3 is not particularly limited. A polyamide resin may be used as an example of the material of the balloon 3. As shown in FIG. 1, a shape of the cross section of the balloon 3 in the inflated state is substantially round with the reference axis C1 at the center. That is, the reference axis C1 is arranged at a position that is equidistant from each portion of the balloon 3. Note that in FIG. 1, the distance between the reference axis C1 and each of a flexible portion 30B and a rigid portion 30A that will be described later is shown to be slightly different for ease of explanation. However, the amount of difference between the distance between the reference axis C1 and the rigid portion 30A and the distance between the reference axis C1 and the flexible portion 30B is extremely small compared to each of the distances. Therefore, essentially, the reference axis C1 is arranged at a position equidistant from each of the portions including the flexible portion 30B and the rigid portion 30A of the balloon 3.

As shown in FIG. 1, a distal end side cone region 3A, an inflatable region 3B, and a proximal end side cone region 3C are defined in the balloon 3. The distal end side cone region 3A is a region extending while increasing in diameter from the distal end 3D toward the proximal end 3P of the balloon 3 in the inflated state. The proximal end side cone region 3C is a region extending while increasing in diameter from the proximal end 3P toward the distal end 3D of the balloon 3 in the inflated state. The inflatable region 3B is a region sandwiched between the distal end side cone region 3A and the proximal end side cone region 3C of the balloon 3 in the inflated state, which has substantially the same diameter in the extending direction. The side surface of the inflatable region 3B of the balloon 3 will hereinafter be referred to as a side surface 30.

The inflatable region 3B of the balloon 3 includes rigid portions 31A, 32A, 33A, and 34A (hereinafter collectively referred to as a rigid portion 30A) and flexible portions 31B, 32B, 33B, and 34B (hereinafter collectively referred to as a flexible portion 30B). The rigid portion 30A and the flexible portion 30B are arranged in the circumferential direction E1 in the following order: the rigid portion 31A, the flexible portion 31B, the rigid portion 32A, the flexible portion 32B, the rigid portion 33A, the flexible portion 33B, the rigid portion 34A, and the flexible portion 34B. The rigid portion 30A and the flexible portion 30B are arranged alternately in the circumferential direction E1. The rigid portions 31A, 32A, 33A, and 34A are arranged at equal intervals in the circumferential direction E1. The circumferential direction E1 corresponds to a direction orthogonal to the reference axis C1 in a direction extending along the inflatable region 3B of the balloon 3.

The rigid portion 30A differs in thickness from the flexible portion 30B. The rigidity of the rigid portion 30A and the flexible portion 30B also differs in accordance with the difference in thickness. The thickness of the flexible portion 30B is thinner than that of the rigid portion 30A, so the rigidity of the flexible portion 30B is smaller than that of the rigid portion 30A. Note that the difference in the rigidity between the rigid portion 30A and the flexible portion 30B need only be obtained from at least one of results from various well-known rigidity tests.

The rigid portion 30A is formed by an adhesive being applied to attach the hard member 6 which will be described later. That is, the material used to form the rigid portion 30A is different from the material used to form the flexible portion 30B. Also, the thickness of the rigid portion 30A is greater than that of the flexible portion 30B by the amount of the adhesive. Also, the rigidity of the rigid portion 30A is higher than that of the flexible portion 30B due to the adhesive being applied.

Figure 2:
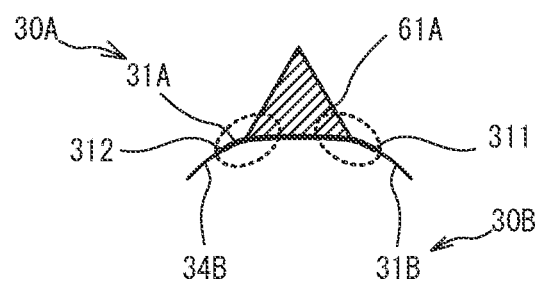
FIG. 2 is a partial enlarged view of a boundary portion of a rigid portion and a soft portion.

The rigidity of the rigid portion 30A gradually becomes smaller toward both end portions, near both end portions in the circumferential direction E1. The rigidity of the flexible portion 30B gradually becomes higher toward both end portions, near both end portions in the circumferential direction E1. The rigidity of the balloon 3 gradually changes in the circumferential direction E1 between the rigid portion 30A and the flexible portion 30B. There is no sudden change in rigidity at the boundary portion between the rigid portion 30A and the flexible portion 30B. Therefore, as shown in FIG. 2, when the balloon is in the inflated state, both end portions of the rigid portion 30A in the circumferential direction E1 bend such that there is no step at the boundary portion between the rigid portion 30A and the flexible portion 30B. Note that in the drawings other than FIG. 2, the rigid portion 30A is not curved but planar in order to simplify the description.

As shown in FIG. 1, the flexible portion 30B curves along an arc centered on the reference axis C1 when the balloon is in the inflated state. The length in the circumferential direction E1 of each of the rigid portions 31A to 34A is the same. The length in the circumferential direction E1 of each of the flexible portions 31B to 34B is the same. The length in the circumferential direction E1 of the rigid portion 30A is shorter than the length in the circumferential direction E1 of the flexible portion 30B. Also, the length in the circumferential direction E1 of the rigid portion 30A is greater than the diameter of the inner tube 22.

Hard Member 6

Hard members 61A, 62A, 63A, and 64A (hereinafter collectively referred to as a hard member 6) are provided on the side surface 30 of the balloon 3. The shape of the hard member 6 is a triangular prism that extends in the extending direction. Each of the hard members 61A, 62A, 63A, and 64A is fixed to a respective one of the rigid portions 31A, 32A, 33A, and 34A of the balloon 3. The hard member 6 protrudes outward from the balloon 3. A side surface of the hard member 6 that is near the reference axis C1 when the balloon 3 is in the inflated state will be referred to as a side surface 601. A portion of the rigid portion 30A of the balloon 3 that contacts the side surface 601 of the hard member 6 will be referred to as joining portion 301.

A length in the circumferential direction E1 of the side surface 601 of the hard member 6 is shorter than a length in the circumferential direction E1 of the rigid portion 30A to which the hard member 6 is joined. Both end portions in the circumferential direction E1 of the rigid portion 30A protrude out on both sides in the circumferential direction E1 from the hard member 6 that is fixed to the rigid portion 30A. The portions corresponding to the end portion on one side and the end portion on the other side in the circumferential direction E1 of the rigid portion 30A when the balloon 3 is in the inflated state will be referred to as end portion 311 and end portion 312, respectively. The end portions 311 and 312 will collectively be referred to as an end portion 310. For example, the end portion 311 of the rigid portion 31A and the end portion 312 of the rigid portion 32A are each joined to the flexible portion 31B. The end portion 311 of the rigid portion 32A and the end portion 312 of the rigid portion 33A are each joined to the flexible portion 32B. The end portion 311 of the rigid portion 33A and the end portion 312 of the rigid portion 34A are each joined to the flexible portion 33B. The end portion 311 of the rigid portion 34A and the end portion 312 of the rigid portion 31A are each joined to the flexible portion 34B.

An apex where two side surfaces 602, other than the side surface 601, of the hard member 6 intersect will be referred to as an apex 600. The direction extending orthogonal to the side surface 601 and extending from the side surface 601 through the apex 600 will be referred to as a protruding direction Y1. In the inflated state, the protruding direction Y1 points toward the outside in the radial direction.

The hardness of the hard member 6 is harder than that of the flexible portion 30B of the balloon 3. Note that the difference in hardness between the hard member 6 and the flexible portion 30B needs only be obtained from at least one of the results of various well-known hardness tests. A magnitude relationship between a hardness of the hard member 6 and a hardness of the rigid portion 30A of the balloon 3 is not limited. The hardness of the hard member 6 may be harder or softer than the hardness of the rigid portion 30A. Or, the hardness of the hard member 6 and the rigid portion 30A may be the same. The material of the hard member 6 is not particularly limited. Metal may be used as an example of the material of the hard member 6. That is, the balloon body 10A is formed by fixing the hard member 6 that are made of a different material than the balloon 3 to the side surface 30 of the rigid portion 30A. The hard member 6 may be formed from the same material as the balloon 3.

Inflation/Deflation of the Balloon 3

As shown in FIG. 3, the balloon 3 in the deflated state has wings 31C, 32C, 33C, and 34C (hereinafter collectively referred to as a wing 30C). The wings 31C, 32C, 33C, and 34C are formed by the flexible portions 31B, 32B, 33B, and 34B of the balloon 3 being folded, and wound onto the hard members 61A, 62A, 63A, and 64A from the outside. The portion on an opposite side from a side near the reference axis C1, i.e., the portion on the outside, of the hard member 6 is covered by the wing 30C. The wing 30C may also be referred to as flaps or wings.

With the balloon 3 in the deflated state, the rigid portion 30A contacts the inner tube 22 of the catheter shaft 2. Also, the end portion 311 of the rigid portion 31A of the balloon 3 comes close to the surface of the rigid portion 32A opposite the surface to which the hard member 62A is fixed, and the portion of the rigid portion 32A other than the end portion 310. More specifically, the end portion 311 of the rigid portion 31A comes close to a joining portion 301 of the rigid portion 32A, to which the hard member 62A is fixed, from the side opposite the side to which the hard member 62A is fixed. Note that although not described in detail, the positional relationship between the rigid portion 33A and the end portion 311 of the rigid portion 32A of the balloon 3, the positional relationship between the rigid portion 34A and the end portion 311 of the rigid portion 33A of the balloon 3, and the positional relationship between the rigid portion 31A and the end portion 311 of the rigid portion 34A of the balloon 3 are all the same. That is, the end portion 311 of the rigid portion 30A comes close to a portion other than the end portions 311 and 312, of another rigid portion 30A adjacent on one side in the circumferential direction E1, more specifically, comes close to the joining portion 301 of another rigid portion 30A adjacent on one side in the circumferential direction E1. Note that the end portion 311 of the rigid portion 31A of the balloon 3 may contact the surface of the rigid portion 32A on the side opposite the surface to which the hard member 62A is fixed, and a portion other than the end portion 310. More specifically, the end portion 311 of the rigid portion 31A may contact the joining portion 301 of the rigid portion 32A to which the hard member 62A is fixed, from the side opposite the side to which the hard member 62A is fixed. The same also applies to the rigid portions 32A to 34A of the balloon 3.

Figure 4:
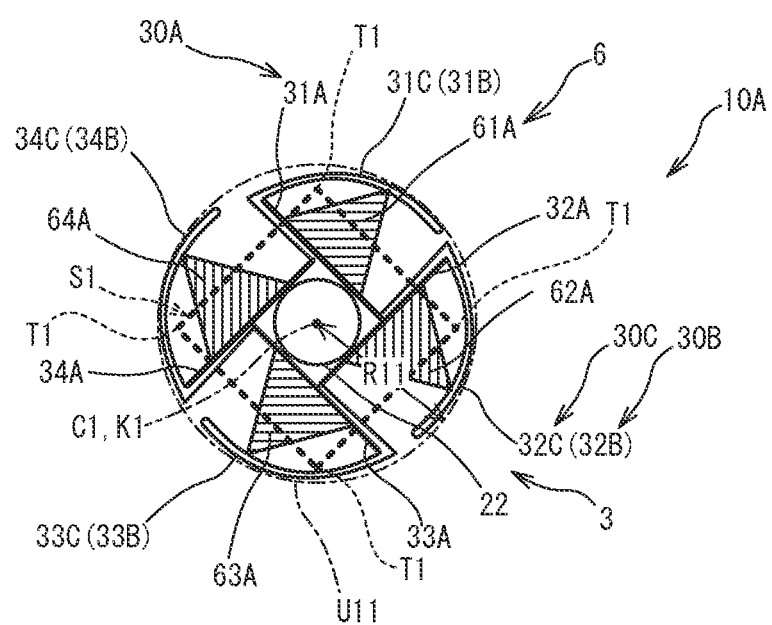
FIG. 4 is a view of a balloon body including the balloon in the deflated state.

As shown in FIG. 4, a virtual closed region S1 is defined in the cross section of the balloon body 10A when the balloon 3 is in the deflated state. The virtual closed region S1 is a region surrounded by cross sections of the rigid portion 30A (rigid portions 31A to 34A) when it is assumed that the end portion 311 of one rigid portion 30A is joined to the end portion 312 of another rigid portion 30A adjacent on one side in the circumferential direction E1 when the balloon 3 is in the inflated state (refer to FIG. 5).

Note that the angle formed between one rigid portion 30A and another rigid portion 30A at joining portions T1 where the end portions 311 and 312 are joined is the same at all of the joining portions T1 in the virtual closed region S1. For example, the balloon body 10A includes four rigid portions 30A (rigid portions 31A to 34A), so the shape of the virtual closed region S1 is a square whose sides are line segments shown by the cross sections of each of the rigid portions 31A to 34A. Also, the angle between one rigid portion 30A and another rigid portion 30A at each of the four corners (the four joining portions T1) of the virtual closed region S1 is 90°.

Also, the virtual closed region S1 is defined such that a center K1 of the virtual closed region S1 coincides with the position of the reference axis C1. Note that the center K1 of the virtual closed region S1 corresponds to a center of gravity of the virtual closed region S1. Moreover, the virtual closed region S1 is defined such that each of the sides of the virtual closed region S1 are parallel to one of the four rigid portions 30A.

When the virtual closed region S1 is defined as described above, a portion of each of the hard members 61A to 64A is disposed inside the virtual closed region S1 in the cross section of the balloon body 10A. In the cross section, a circumscribed circle U11 is defined that contacts the wing 30C of the balloon 3 in the deflated state and is centered on the reference axis C1. The radius of the circumscribed circle U11 is denoted by R11.

Figure 5:
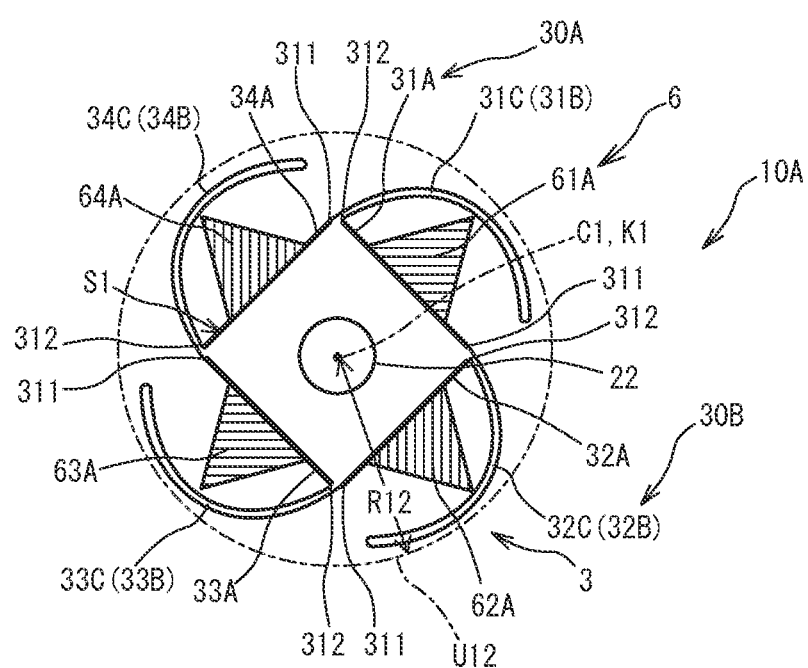
FIG. 5 is a view of a balloon body including the balloon in which rigid portions are arranged along a virtual closed region.

FIG. 5 illustrates a deflated state that differs from the actual deflated state of the balloon 3 (refer to FIG. 4). In FIG. 5, the end portion 312 of the rigid portion 32A contacts the end portion 311 of the rigid portion 31A, the end portion 312 of the rigid portion 33A contacts the end portion 311 of the rigid portion 32A, the end portion 312 of the rigid portion 34A contacts the end portion 311 of the rigid portion 33A, and the end portion 312 of the rigid portion 31A contacts the end portion 311 of the rigid portion 34A. That is, in FIG. 5, a line segment indicated by cross sections of each of the rigid portions 31A to 34A is arranged at a position on each side of the virtual closed region S1.

When the rigid portion 30A are arranged as shown in FIG. 5, each of the hard members 61A to 64A is arranged outside the virtual closed region S1, in the cross section of the balloon body 10A. In the cross section, a circumscribed circle U12 is defined that contacts the wing 30C of the balloon 3 and is centered on the reference axis C1. The radius of the circumscribed circle U12 is denoted by R12. The radius R12 is larger than the radius R11 in FIG. 4. That is, by arranging the rigid portion 30A of the balloon 3 in the deflated state as shown in FIG. 4, the diameter of the balloon 3 becomes smaller than that shown in FIG. 5.

Figure 6A:
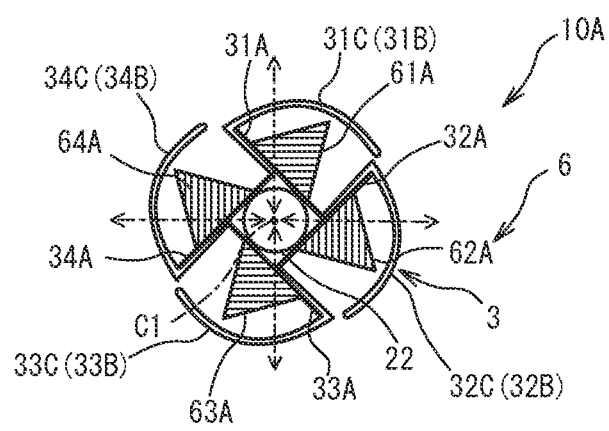
FIG. 6A is a view illustrating the way in which the balloon body changes between the deflated state and the inflated state.
Figure 6B:
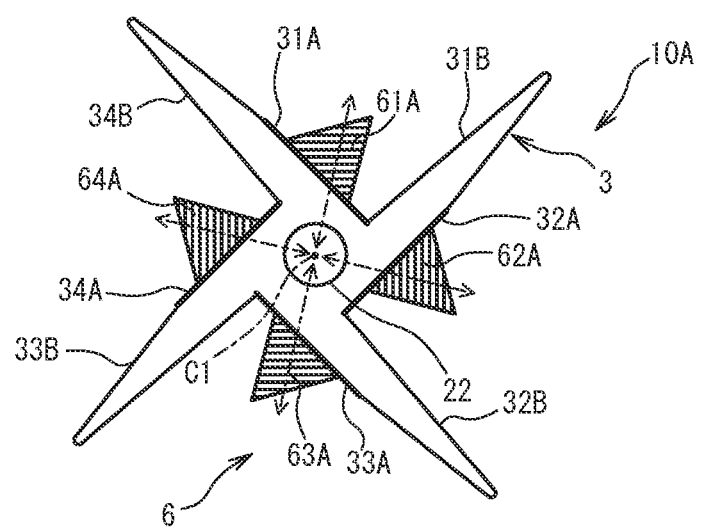
FIG. 6B is a view illustrating the way in which the balloon body changes between the deflated state and the inflated state.
Figure 6C:
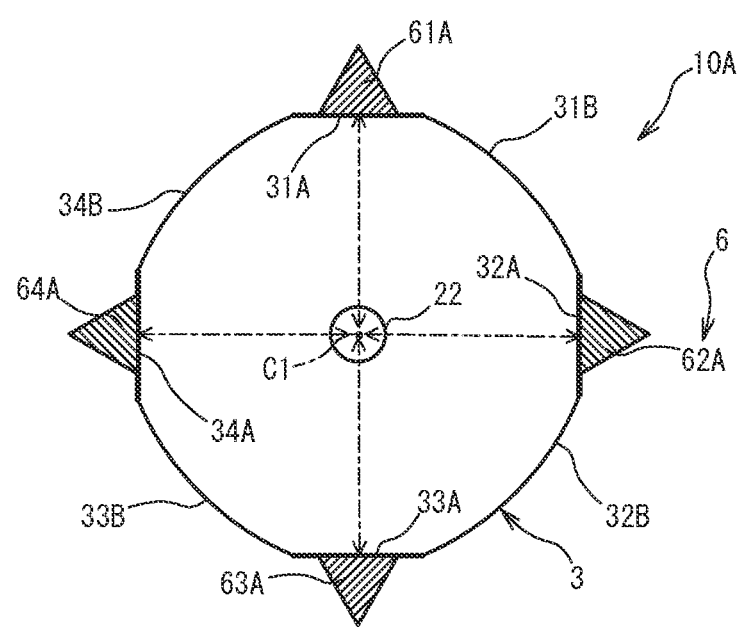
FIG. 6C is a view illustrating the way in which the balloon body changes between the deflated state and the inflated state.

FIG. 6A to FIG. 6C illustrate the way in which the balloon 3 of the balloon body 10A changes between the deflated state and the inflated state. It will be assumed that compressed fluid is supplied from the hub, not shown in the drawings, to the balloon 3 in the deflated state shown in FIG. 6A. In this case, as shown in FIG. 6B, the flexible portions 31B to 34B of the balloon 3 expand and the wings 31C to 34C (refer to FIG. 6A) are freed. The hard members 61A to 64A each move outward in the radial direction. The hard members 61A to 64A each move away from the reference axis C1.

Moreover, when the compressed fluid is supplied to the balloon 3, the hard members 61A to 64A each move farther in a direction away from the reference axis C1 while rotating such the protruding direction Y1 changes (refer to FIG. 1). As a result, the balloon 3 comes to be in the inflated state as shown in FIG. 6C.

Conversely, it will now be assumed that compressed fluid is removed from the balloon 3 in the inflated state shown in FIG. 6C. In this case, the flexible portions 31B to 34B of the balloon 3 are folded as shown in FIG. 6B. Also, the hard members 61A to 64A move inward in the radial direction with respect to their positions (refer to FIG. 6C) when the balloon 3 is in the inflated state. At this time, the hard members 61A to 64A each move in a direction closer to the reference axis C1.

Furthermore, when the compressed fluid is removed from the balloon 3, the hard members 61A, 62A, 63A, and 64A each move farther in the direction closer to the reference axis C1. Also, the flexible portions 31B to 34B of the balloon 3 wrap around the hard members 61A to 64A in the folded state to form the wings 31C to 34C. As a result, the balloon 3 comes to be in the deflated state as shown in FIG. 6A.

Note that in the balloon 3, the rigid portion 30A is predisposed to being arranged as shown in FIG. 6A when the balloon 3 changes from the inflated state to the deflated state.

Operation and Effects of the First Embodiment

With the balloon catheter 1A, the radius R11 of the balloon body 10A when the balloon 3 is in the deflated state (refer to FIG. 4) is able to be smaller than the radius R12 of the balloon body 10A in a state in which the rigid portion 30A are arranged along the virtual closed region S1 (refer to FIG. 5). Therefore, the diameter of the balloon catheter 1A in the deflated state can be reduced, even when the hard member 6 is provided on the balloon 3.

In the virtual closed region S1, the center K1 corresponding to the center of gravity is arranged in a position coinciding with the reference axis C1. In this case, in the balloon catheter 1A, the diameter of the balloon body 10A can be uniformly reduced in the circumferential direction E1.

In the balloon 3 in the inflated state, the shape of the cross section orthogonal to the reference axis C1 is substantially round, and the reference axis C1 is arranged in a position equal in distance from each portion of the balloon 3. In this case, the balloon catheter 1A can minimize the diameter of the balloon body 10A by uniformly deflating the balloon 3 in the circumferential direction E1 when the balloon 3, which has a substantially round cross section in the inflated state, is in the deflated state.

When the balloon 3 is in the deflated state, each of the end portions 311 of the rigid portion 30A is close to a portion, other than the end portions 311 and 312, of another rigid portion 30A that is adjacent on one side in the circumferential direction E1, more specifically, close to the joining portion 301 of another rigid portion 30A. In this case, the balloon catheter 1A can easily be placed in a state in which a portion of the hard member 6 is disposed within the virtual closed region S1 when the balloon 3 is in the deflated state.

When the balloon 3 is in the deflated state, the flexible portion 30B cover the side of the hard member 6 opposite the side near the reference axis C1. In this case, with the balloon catheter 1A, the flexible portion 30B can inhibit the hard member 6 from getting caught in a blood vessel, in a deflated state. Therefore, with the balloon catheter 1A, the balloon body 10A can better pass through the blood vessel.

Second Embodiment (Balloon Catheter 1B)

A balloon catheter 1B according to a second embodiment will now be described with reference to FIG. 7 to FIG. 11C. The balloon catheter 1B has the catheter shaft 2 and a balloon body 10B. The structure of the catheter shaft 2 is the same as that of the catheter shaft 2 (refer to FIG. 1 and FIG. 3) of the balloon catheter 1A of the first embodiment, so a description thereof will be omitted. Descriptions of other structure common to the first embodiment will be simplified.

Balloon Body 10B

Figure 7:
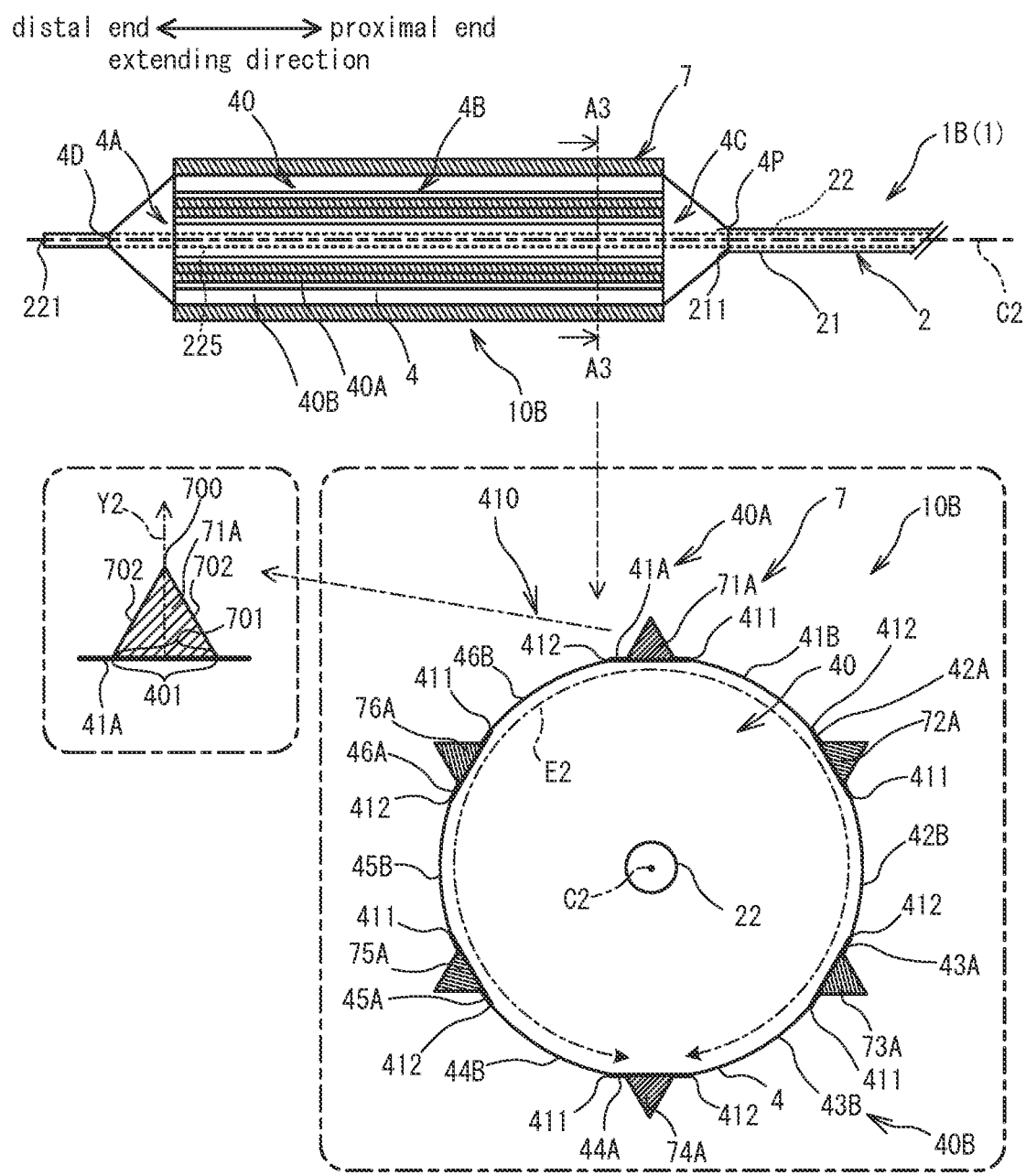
FIG. 7 is a view of a balloon catheter including a balloon in the inflated state.
Figure 8:
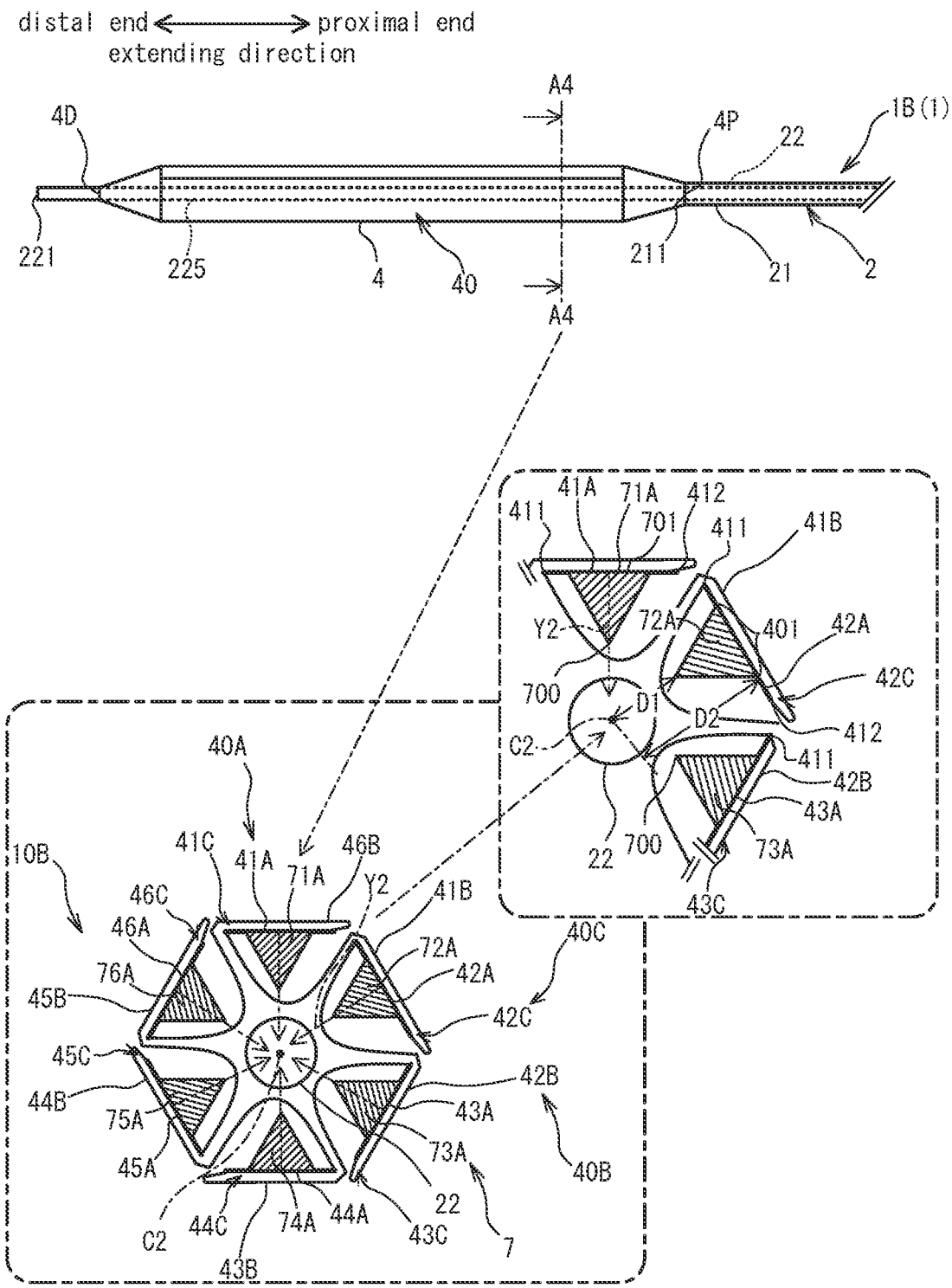
FIG. 8 is a view of the balloon catheter including the balloon in the deflated state.

The balloon body 10B has a balloon 4 and a hard member 7. The balloon 4 corresponds to the balloon 3 of the first embodiment. FIG. 7 shows the balloon 4 in an inflated state, and FIG. 8 shows the balloon 4 in a deflated state.

Balloon 4

A distal end 4D, a proximal end 4P, a distal end side cone region 4A, an inflatable region 4B, a proximal end side cone region 4C, and a side surface 40 of the balloon 4 shown in FIG. 7 correspond to the distal end 3D, the proximal end 3P, the distal end side cone region 3A, the inflatable region 3B, the proximal end side cone region 3C, and the side surface 30 of the balloon 3 in the first embodiment, respectively. The sectional shape of the balloon 4 in the inflated state is substantially round with a reference axis C2 at the center. That is, the reference axis C2 is arranged in a position equal in distance from each portion of the balloon 4.

The inflatable region 4B of the balloon 4 includes rigid portions 41A, 42A, 43A, 44A, 45A, and 46A (hereinafter collectively referred to as a rigid portion 40A) and flexible portions 41B, 42B, 43B, 44B, 45B, and 46B (hereinafter collectively referred to as a flexible portion 40B). The rigid portion 40A and the flexible portion 40B are arranged in the circumferential direction E2 in the following order: the rigid portion 41A, the flexible portion 41B, the rigid portion 42A, the flexible portion 42B, the rigid portion 43A, the flexible portion 43B, the rigid portion 44A, the flexible portion 44B, the rigid portion 45A, the flexible portion 45B, the rigid portion 46A, and the flexible portion 46B. The rigid portion 40A and the flexible portion 40B are arranged alternately in the circumferential direction E2. The rigid portions 41A, 42A, 43A, 44A, 45A, and 46A are arranged at equal intervals in the circumferential direction E2.

The rigid portion 40A differs in thickness from the flexible portion 40B. The rigidity of the rigid portion 40A and the flexible portion 40B also differs in accordance with the difference in thickness. The thickness of the flexible portion 40B is thinner than that of the rigid portion 40A, so the rigidity of the flexible portion 40B is smaller than that of the rigid portion 40A. The flexible portion 40B curves along an arc centered around the reference axis C2 when the balloon 4 is in the inflated state. The length in the circumferential direction E2 of the rigid portion 40A is shorter than the length in the circumferential direction E2 of the flexible portion 40B. The length in the circumferential direction E2 of the rigid portion 40A is greater than the diameter of the inner tube 22. The other features of the rigid portion 40A and the flexible portion 40B are the same as those of the rigid portion 30A and the flexible portion 30B in the first embodiment.

Hard Member 7

Hard members 71A, 72A, 73A, 74A, 75A, and 76A (hereinafter collectively referred to as a hard member 7) are fixed to the side surface 40 of the balloon 4. The shape of the hard member 7 is the same as that of the hard member 6 in the first embodiment. Each of the hard members 71A, 72A, 73A, 74A, 75A, and 76A is fixed to a respective one of the rigid portions 41A, 42A, 43A, 44A, 45A, and 46A of the balloon 4. The hard member 7 protrudes outward from the balloon 4. A portion of the rigid portion 40A of the balloon 4 that contacts a side surface 701 of the hard member 7 will be referred to as joining portion 401.

A length in the circumferential direction E2 of the side surface 701 of the hard member 7 is shorter than a length in the circumferential direction E2 of the rigid portion 40A to which the hard member 7 is joined. Both end portions in the circumferential direction E2 of the rigid portion 40A protrude out on both sides in the circumferential direction E2 from the hard member 7 that is fixed to the rigid portion 40A. End portions 411 and 412 of the rigid portion 40A correspond to the end portions 311 and 312 of the rigid portion 30A in the first embodiment, respectively. The end portions 411 and 412 will collectively be referred to as an end portion 410. An apex where two side surfaces 702, other than the side surface 701, of the hard member 7 intersect will be referred to as an apex 700. The direction extending orthogonal to the side surface 701 and extending from the side surface 701 through the apex 700 will be referred to as a protruding direction Y2. The protruding direction Y2 points toward the outside in the radial direction.

Deflation/Inflation of the Balloon 4

As shown in FIG. 8, the balloon 4 in the deflated state has wings 41C, 42C, 43C, 44C, 45C, and 46C (hereinafter collectively referred to as a wing 40C). The wing 41C, 42C, 43C, 44C, 45C, and 46C are formed by folding the rigid portion 41A and the flexible portion 46B (wing 41C), the rigid portion 42A and the flexible portion 41B (wing 42C), the rigid portion 43A and the flexible portion 42B (wing 43C), the rigid portion 44A and the flexible portion 43B (wing 44C), the rigid portion 45A and the flexible portion 44B (wing 45C), and the rigid portion 46A and the flexible portion 45B (wing 46C). In a cross section of the balloon body 10B, the wing 40C is arranged at position corresponding to each of the sides of a regular hexagon.

With the balloon 4 in the deflated state, the end portion 412 of the rigid portion 41A comes close to the end portion 411 of the rigid portion 42A. The end portion 412 of the rigid portion 42A comes close to the end portion 411 of the rigid portion 43A. The positional relationships of the rigid portions 43A, 44A, 45A, and 46A are the same. The portion on the opposite side from the side near the reference axis C2, i.e., the portion on the outside, of the hard member 7 is covered by the wing 40C.

With the balloon 4 in the deflated state, unlike the balloon 3 in the first embodiment, the rigid portion 40A does not contact the inner tube 22 of the catheter shaft 2 but is separated therefrom. The hard member 7 is interposed between the rigid portion 40A and the inner tube 22. The protruding direction Y2 extending from the side surface 701 of the hard member 7 through the apex 700 extends in the radial direction and points toward the inner reference axis C2.

The shortest distance between the hard member 7 and the reference axis C2 is denoted by D1. The distance D1 corresponds to the distance in the radial direction between the reference axis C2 and the apex 700 of the hard member 7. The shortest distance between the reference axis C2 and the joining portion 401 of the rigid portion 40A is denoted by D2. The distance D1 is shorter than the distance D2.

Figure 9:
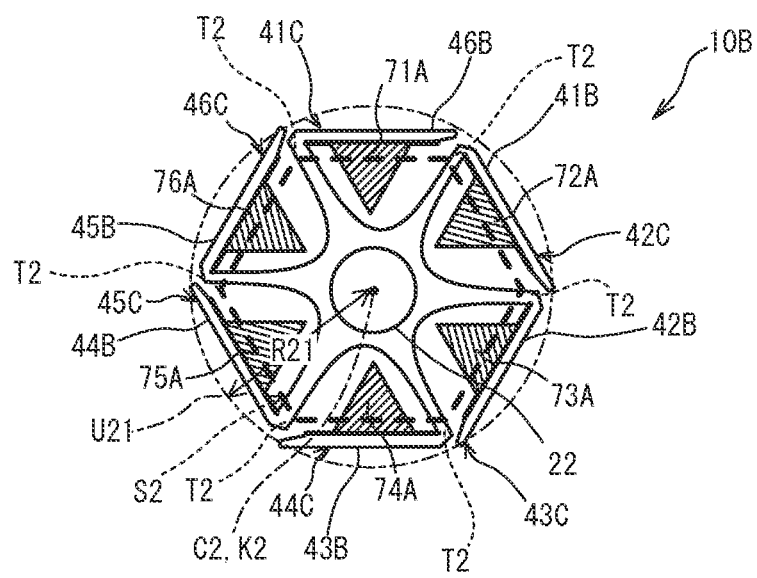
FIG. 9 is a view of the balloon body including the balloon in the deflated state.

As shown in FIG. 9, a virtual closed region S2 is defined in the cross section of the balloon body 10B when the balloon 4 is in the deflated state. The virtual closed region S2 is a region surrounded by cross sections of the rigid portion 40A (rigid portions 41A to 46A) when it is assumed that the end portion 411 of one rigid portion 40A is joined to the end portion 412 of another rigid portion 40A adjacent on one side in the circumferential direction E2 when the balloon 4 is in the inflated state.

For example, the balloon body 10B includes six rigid portions 40A (rigid portions 41A to 46A), so the shape of the virtual closed region S2 is a regular hexagon whose sides are line segments shown by the cross sections of each of the rigid portions 41A to 46A. Also, the angle between one rigid portion 40A and another rigid portion 40A at each of the six corners (a joining portion T2 of the end portion 411 of one rigid portion 40A and the end portion 412 of another rigid portion 40A) of the virtual closed region S2 is 120°.

Also, the virtual closed region S2 is defined such that a center K2 of the virtual closed region S2 coincides with the position of the reference axis C2. Note that the center K2 of the virtual closed region S2 corresponds to a center of gravity of the virtual closed region S2. Moreover, the virtual closed region S2 is defined such that all of the sides of the virtual closed region S2 are parallel to one of the six rigid portions 40A.

When the virtual closed region S2 is defined as described above, a portion of each of the hard members 71A to 76A is disposed inside the virtual closed region S2 in the cross section of the balloon body 10B. In the cross section, a circumscribed circle U21 is defined that contacts the wing 40C of the balloon 4 in the deflated state and is centered on the reference axis C2. The radius of the circumscribed circle U21 is denoted by R21.

Figure 10:
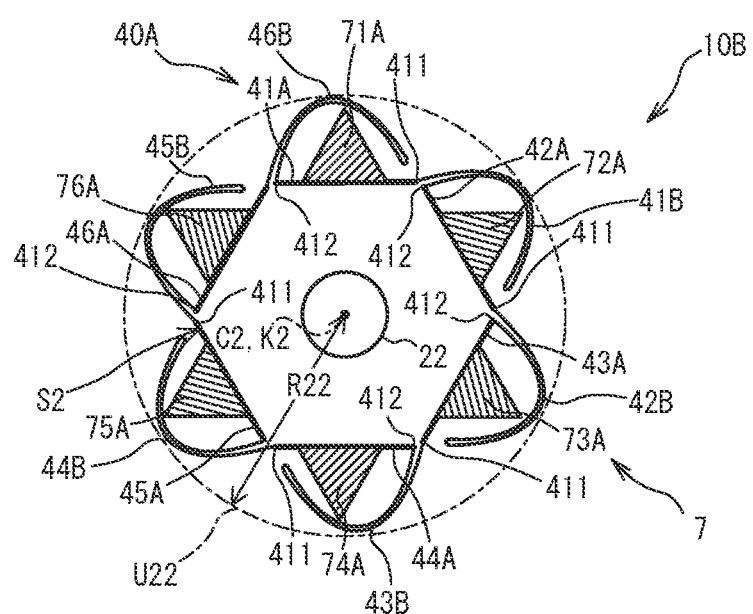
FIG. 10 is a view of the balloon body including the balloon in which rigid portions are arranged along a virtual closed region.

FIG. 10 illustrates a deflated state that differs from the actual deflated state of the balloon 4 (refer to FIG. 9). In FIG. 10, a line segment indicated by cross section of each of the rigid portions 41A to 46A is arranged at a position on each side of the virtual closed region S2. In this case, each of the hard members 71A to 76A is arranged outside the virtual closed region S2, in the cross section of the balloon body 10B. In the cross section, a circumscribed circle U22 is defined that contacts the wing 40C formed by the flexible portions 41B to 46B of the balloon 4 being folded, and is centered on the reference axis C2. The radius of the circumscribed circle U22 is denoted by R22. The radius R22 is larger than the radius R21 in FIG. 9. That is, by arranging the rigid portion 40A of the balloon 4 in the deflated state as shown in FIG. 9, the diameter of the balloon 4 becomes smaller.

Figure 11A:
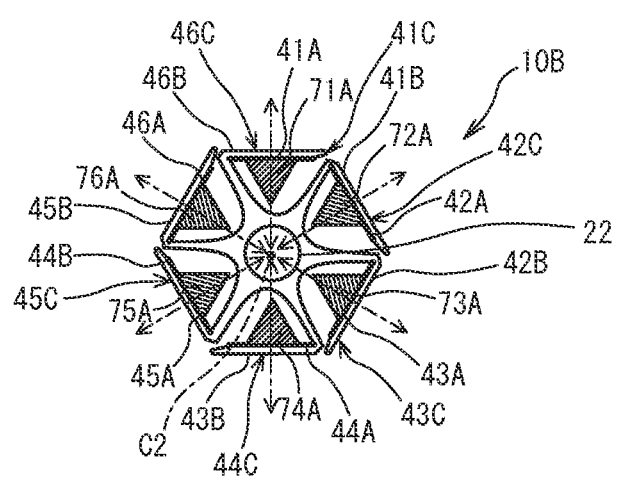
FIG. 11A is a view illustrating the way in which the balloon body changes between the deflated state and the inflated state.
Figure 11B:
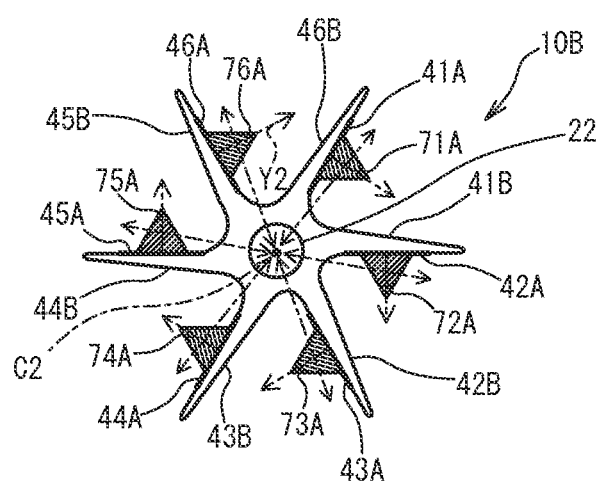
FIG. 11B is a view illustrating the way in which the balloon body changes between the deflated state and the inflated state.
Figure 11C:
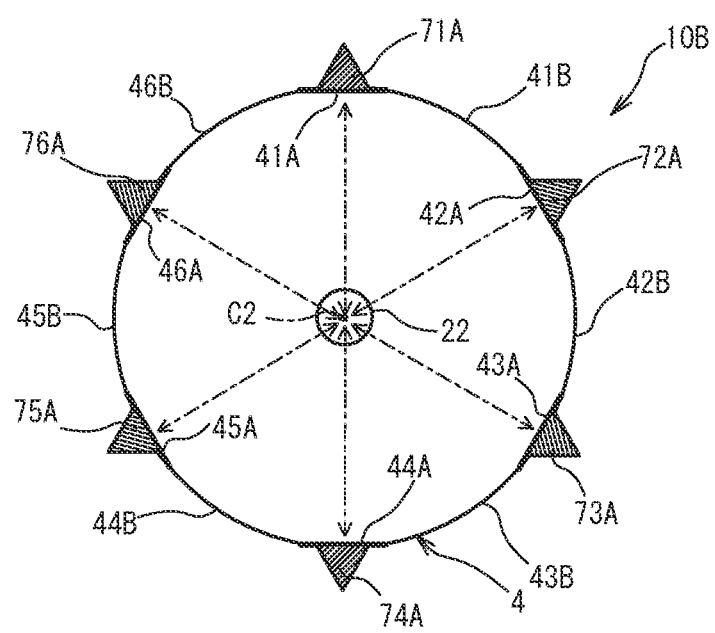
FIG. 11C is a view illustrating the way in which the balloon body changes between the deflated state and the inflated state.

FIG. 11A to FIG. 11C illustrate the way in which the balloon 4 of the balloon body 10B changes between the deflated state and the inflated state. It will be assumed that compressed fluid is supplied from the hub, not shown in the drawings, to the balloon 4 in the deflated state shown in FIG. 11A. In this case, as shown in FIG. 11B, the flexible portions 41B to 46B of the balloon 4 expand and the wings 41C to 46C (refer to FIG. 11A) are freed. The hard members 71A to 76A each move outward in the radial direction while rotating such that the protruding direction Y2 points outward. At this time, the hard members 71A to 76A each move away from the reference axis C2.

Moreover, when the compressed fluid is supplied to the balloon 4, the hard members 71A to 76A each move farther in a direction away from the reference axis C2. As a result, the balloon 4 comes to be in the inflated state as shown in FIG. 11C. At this time, the protruding direction Y2 of each of the hard members 71A to 76A points outward.

Conversely, it will now be assumed that compressed fluid is removed from the balloon 4 in the inflated state shown in FIG. 11C. In this case, the flexible portions 41B to 46B of the balloon 4 are folded as shown in FIG. 11B. Also, the hard members 71A to 76A move inward in the radial direction with respect to their positions (refer to FIG. 11C) when the balloon 4 is in the inflated state. At this time, the hard members 71A to 76A each move in a direction closer to the reference axis C2 while rotating such that the protruding direction Y2 (refer to FIG. 7) points inward.

Furthermore, when the compressed fluid is removed from the balloon 4, the hard members 71A to 76A each move farther in the direction closer to the reference axis C2 while rotating such that the protruding direction Y2 points inward. Also, the flexible portions 41B to 46B of the balloon 4 cover the hard members 71A to 76A in a folded state from the outside. The wings 41C to 46C are formed by the rigid portions 41A to 46A and the flexible portions 41B to 46B. As a result, the balloon 4 comes to be in the deflated state as shown in FIG. 11A. At this time, the protruding direction Y2 of each of the hard members 71A to 76A points toward the inner reference axis C2.

Note that in the balloon 4, the rigid portion 40A is predisposed to being arranged as shown in FIG. 11A when the balloon 4 changes from the inflated state to the deflated state.

Operation and Effects of the Second Embodiment

With the balloon catheter 1B, the radius R21 of the balloon body 10B when the balloon 4 is in the deflated state (refer to FIG. 9) is able to be smaller than the radius R22 of the balloon body 10B in a state in which the rigid portion 40A are arranged along the virtual closed region S2 (refer to FIG. 10). Therefore, the diameter of the balloon catheter 1B in the deflated state can be reduced even when the hard member 7 is provided on the balloon 4.

In the virtual closed region S2, the center K2 corresponding to the center of gravity is arranged in a position coinciding with the reference axis C2. In this case, in the balloon catheter 1B, the diameter of the balloon body 10B can be uniformly reduced in the circumferential direction E2.

In the balloon 4 in the inflated state, the shape of the cross section orthogonal to the reference axis C2 is substantially round, and the reference axis C2 is arranged in a position equal in distance from each portion of the balloon 4. In this case, the balloon catheter 1B can minimize the diameter of the balloon body 10B by uniformly deflating the balloon 4 in the circumferential direction E2 when the balloon 4, which has a substantially round cross section in the inflated state, is in the deflated state.

When the balloon 4 is in the deflated state, the distance D1, which is the shortest distance between the reference axis C2 and the hard member 7, is less than the distance D2, which is the shortest distance between the reference axis C2 and the joining portion 401 of the rigid portion 40A. In this case, the balloon body 10B can easily be placed in a state in which a portion of the hard member 7 is disposed within the virtual closed region S2 when the balloon 4 is in the deflated state.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modified Examples

The present disclosure is not limited to the first and second embodiments, and can be modified in various ways. Hereinafter, unless otherwise noted, modified examples will be described in detail giving the first embodiment as an example. However, the content of the modified examples below can also be applied to the second embodiment.

The inner tube 22 of the balloon catheter 1A need not have the protruding portion 225. In this case, a tube is not provided inside the balloon 3 and the distal end 3D of the balloon 3 may be closed off. Instead of the inner tube 22, a flexible shaft may be provided.

The hard member 6 may be integrally formed with the balloon 3. That is, a portion of the balloon 3 may function as the hard member 6. Note that in this case, the hardness of the balloon 3 and the hard member 6 may be set differently depending on the difference in the degree of orientation (degree of crystallinity) of the resin used to form the balloon 3. The shape of the hard member 6 is not limited to a triangular prism, and may be any appropriate shape. For example, the end portion of the hard member 6 on the side opposite the joining portion 301 that joins with the rigid portion 30A of the balloon 3 need not be sharp or may be curved. The hard member 6 need not extend along the entire region in the extending direction of the inflatable region 3B of the balloon 3. For example, the hard member 6 may be divided into a plurality of parts in the extending direction. The rigid portion 30A, the flexible portion 30B, and the hard member 6 may also be provided on the distal end side cone region 3A and the proximal end side cone region 3C of the balloon 3.

The rigid portion 30A and the flexible portion 30B may be formed of the same material. Note that in this case, the rigidity of the rigid portion 30A and the flexible portion 30B may be set differently depending on the degree of orientation (degree of crystallinity) of the resin used to form the balloon 3.

The boundary between the rigid portion 30A and the flexible portion 30B may be defined on the basis of a rigidity threshold value. The hard member 6 may also protrude inward with respect to the rigid portion 30A.

The lengths in the circumferential direction E1 of the rigid portions 31A to 34A may all be different. In this case, the shape of the virtual closed region S1 is not limited to a square, but is a polygon whose sides are the cross sections of the rigid portions 31A to 34A each having a different length. Also, the shape of the rigid portion 30A is not limited to a planar shape, and may be curved. In this case, the shape of the virtual closed region S1 is not limited to a square, but is a closed area surrounded by the curved cross sections of the rigid portions 31A to 34A.

The length in the circumferential direction E1 of the rigid portion 30A may be approximately the same as the length in the circumferential direction E1 of the side surface 601 of the hard member 6. In this case, both end portions in the circumferential direction E1 of the rigid portion 30A need not protrude on both sides from the hard member 6 in the circumferential direction E1. Moreover, in this case, the hard member 6, the rigid portion 30A, and the joining portion 301 may be formed of the same material. With this configuration, the balloon 3 is able to be made easily.

The number of the rigid portion 30A, the flexible portion 30B, and the hard member 6 is not limited to four each, and may be any number equal to or greater than two.

The center K1 of the virtual closed region S1 is not limited to the center of gravity of the virtual closed region S1. An example in which there are three each of the rigid portion 30A, the flexible portion 30B, and the hard member 6 will now be described in detail with reference to FIG. 12A to FIG. 12D. The three rigid portions 30A are denoted by rigid portions 35A, 36A, and 37A, and in this case, a case where a virtual closed region S3 is defined will be illustrated.

Figure 12A:
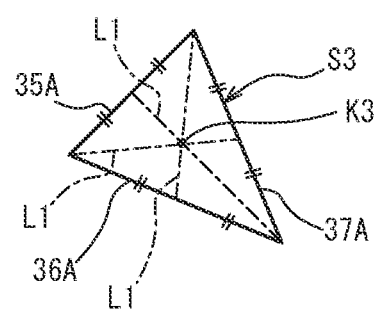
FIG. 12A is a view showing a center of the virtual closed region.
Figure 12B:
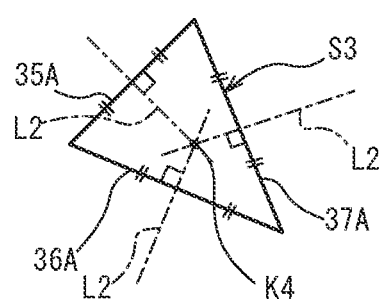
FIG. 12B is a view showing a center of the virtual closed region.
Figure 12C:
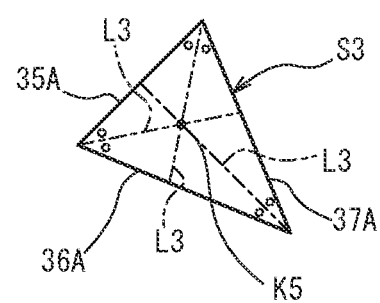
FIG. 12C is a view showing a center of the virtual closed region.
Figure 12D:
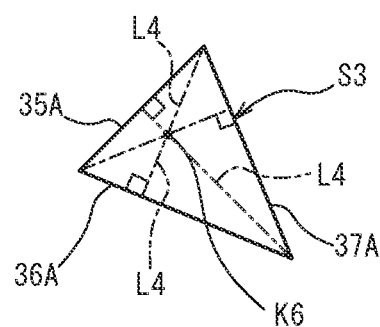
FIG. 12D is a view showing a center of the virtual closed region.

As shown in FIG. 12A, a center K3 of the virtual closed region S3 is not limited to the intersection of three median lines L1 of the triangle indicating the virtual closed region S3, that is, the center of gravity. For example, as shown in FIG. 12B, a center K4 of the virtual closed region S3 may coincide with the intersection of perpendicular bisectors L2 of each side of a triangle indicating the virtual closed region S3, that is, the circumcenter. For example, as shown in FIG. 12C, a center K5 of the virtual closed region S3 may coincide with the intersection of bisectors L3 of the respective apex angles of a triangle indicating the virtual closed region S3, that is, the incenter. For example, as shown in FIG. 12D, a center K6 of the virtual closed region S3 may coincide with the intersection of perpendicular lines L4 drawn from each vertex of the triangle representing the virtual closed region S3 on opposite sides, that is, the orthocenter. Even in these cases, the balloon catheter 1A is able to uniformly reduce the diameter of the balloon body 10A in the circumferential direction E1.

The shape of the cross section orthogonal to the reference axis C1 of the balloon 3 in the inflated state is substantially round with a different curvature at the rigid portion 30A and the flexible portion 30B. The distance in the radial direction from the reference axis C1 to the rigid portion 30A is slightly less than the distance in the radial direction from the reference axis C1 to the flexible portion 30B. Note that the shape of the cross section orthogonal to the reference axis C1 of the balloon 3 in the inflated state is not limited to a substantially round shape, and may be elliptical or polygonal or the like.

When the balloon 3 is in the deflated state, the end portion 311 of the rigid portion 30A may be in close excluding the end portions 311 and 312 of another rigid portion 30A and excluding the joining portion 301 of another rigid portion 30A.

The wing 31C may cover the hard member 64A from the outside. The wing 32C may cover the hard member 61A from the outside. The wing 33C may cover the hard member 62A from the outside. The wing 34C may cover the hard member 63A from the outside. The wing 30C also needs not cover the hard member 6 from the outside.

Figure 13:
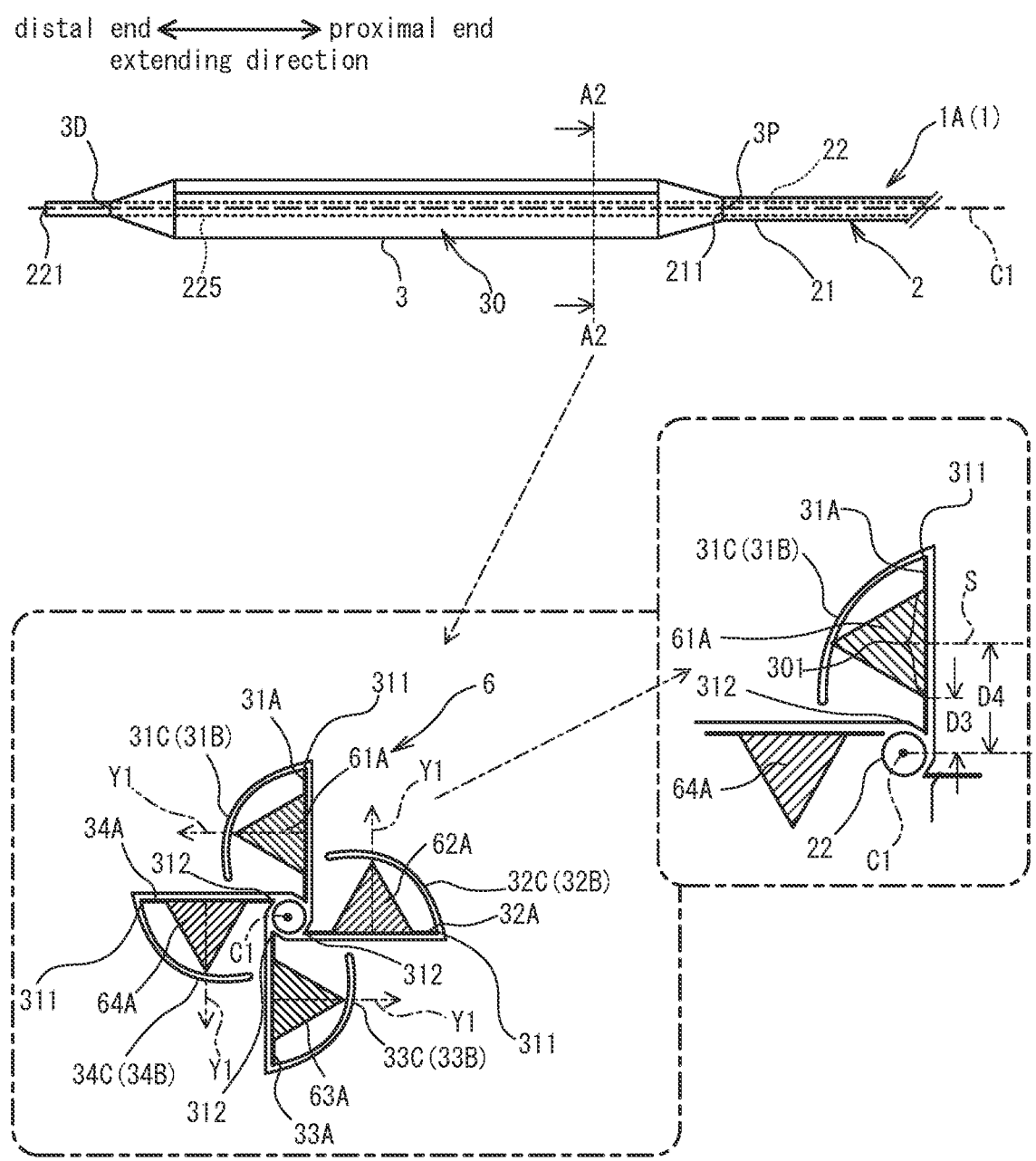
FIG. 13 is a view of a modified example of a balloon catheter including a balloon in a deflated state.

When the balloon 3 is in the deflated state, the hard member 6, the rigid portion 30A, and the flexible portion 30B may be arranged as shown in FIG. 13. In this case, the protruding direction Y1 of the hard member 6 extends toward a direction orthogonal to the reference axis C1. In FIG. 13, a midpoint S of the joining portion 301 of the rigid portion 30A in the circumferential direction E1 in the inflated state is defined. The shortest distance between the reference axis C1 and the hard member 6 is denoted by D3. A distance D3 corresponds to a distance in the radial direction between the reference axis C1 and the end portion of a side surface 601 of the hard member 6 which is on the side near the reference axis C2. The shortest distance between the reference axis C1 and the midpoint S of the joining portion 301 is denoted D4. The distance D3 is shorter than the distance D4. In this case, the balloon body 10A can easily be placed a state in which a portion of the hard member 6 is disposed within the virtual closed region S1 when the balloon 3 is in the deflated state.

In the cross section of the balloon body 10B according to the second embodiment, the hard members 71A to 76A may be arranged such that they are all entirely inside the virtual closed region S2. In this case, the end portion 412 of the rigid portion 41A may abut against the end portion 411 of the rigid portion 42A with the flexible portion 41B sandwiched therebetween. The end portion 412 of the rigid portion 42A may abut against the end portion 411 of the rigid portion 43A with the flexible portion 42B sandwiched therebetween. The end portion 412 of the rigid portion 43A may abut against the end portion 411 of the rigid portion 43A with the flexible portion 43B sandwiched therebetween. The end portion 412 of the rigid portion 44A may abut against the end portion 411 of the rigid portion 44A with the flexible portion 44B sandwiched therebetween. In this case, the balloon catheter 1B is able to minimize the diameter of the balloon body 10B when the balloon 4 is in deflated state.

Figure 14:
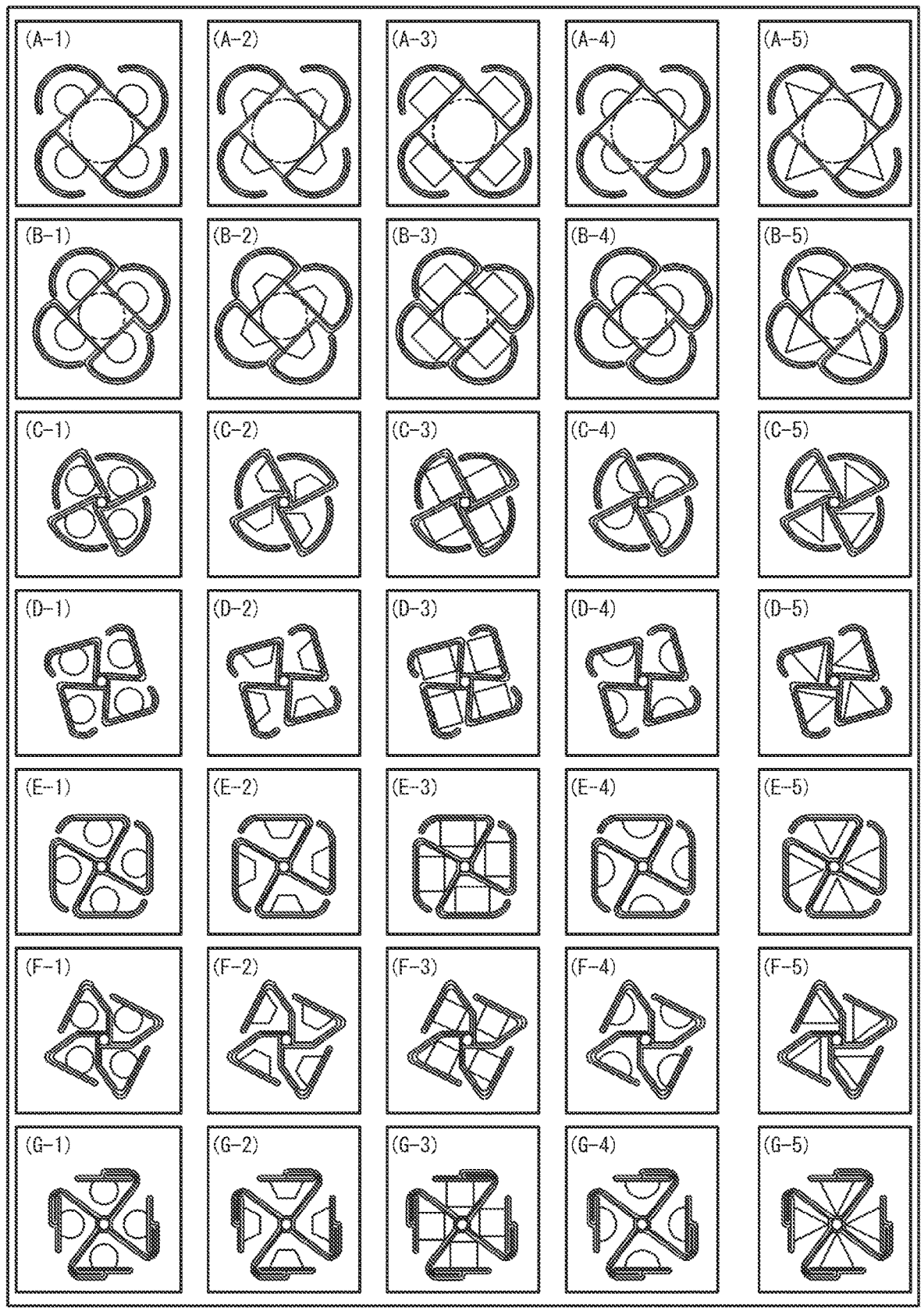
FIG. 14 is a view of various embodiments of the balloon in the deflated state.

A shape of the hard member 6, and the arrangement of the rigid portion 30A, flexible portion 30B, wing 30C, and the hard member 6 when the balloon 3 is in the deflated state are not limited to those described above. The various shapes and arrangements shown in FIG. 14 are possible, for example.

What is claimed is:

1. A balloon body for a catheter comprising:
   a balloon configured to change shape between a deflated state and an inflated state; and
   a plurality of hard members being positioned on a side surface of the balloon and protruding outward, wherein the balloon includes
      a plurality of rigid portions, each of the plurality of rigid portions having at least one joining portion provided with each of the plurality of hard members, and
      a plurality of flexible portions being arranged between the plurality of rigid portions in a circumferential direction, and a rigidity of the plurality of flexible portions is less than that of the plurality of rigid portions,
   the balloon is configured to change shape such that each of the plurality of hard members moves in a direction away from a predetermined reference axis when the balloon switches from the deflated state to the inflated state, and is configured to change shape such that each of the plurality of hard members moves in a direction closer to the predetermined reference axis when the balloon switches from the inflated state to the deflated state,
   the plurality of hard members are harder than the plurality of flexible portions of the balloon, and
   in a cross section orthogonal to the predetermined reference axis, at least a portion of each of the plurality of hard members that are protruding outward with respect to the balloon provided on the balloon in the deflated state, is arranged in a virtual closed region, the virtual closed region being formed when an end portion in the circumferential direction of each of the plurality of rigid portions is joined to an end portion in the circumferential direction of another rigid portion adjacent in the circumferential direction, and the predetermined reference axis being arranged at a center of the virtual closed region.

2. The balloon body for the catheter according to claim 1, wherein
   the center of the virtual closed region is any one of the centers of gravity, an incenter, a circumcenter, or an orthocenter.

3. The balloon body for the catheter according to claim 1, wherein
   a shape of a cross section orthogonal to the predetermined reference axis of the balloon in the inflated state is substantially round, and
   the predetermined reference axis is arranged at a position equal in distance from each portion of the balloon in the inflated state.

4. The balloon body for the catheter according to claim 1, wherein
   when the balloon is in the deflated state, the end portion in the circumferential direction of each of the plurality of rigid portions is close to a portion other than the end portion of another rigid portion adjacent in the circumferential direction.

5. The balloon body for the catheter according to claim 4, wherein when the balloon is in the deflated state, the end portion in the circumferential direction of each of the plurality of rigid portions is close to the at least one joining portion included in another rigid portion adjacent in the circumferential direction.

6. The balloon body for the catheter according to claim 1, wherein
   when the balloon is in the deflated state, each of the plurality of flexible portions covers a corresponding one of the plurality of hard members from a side opposite a side of each of the plurality of hard members that is near the predetermined reference axis.

7. The balloon body for the catheter according to claim 1, wherein
   in a cross section orthogonal to the predetermined reference axis, all of the plurality of hard members are arranged within the virtual closed region.

8. The balloon body for the catheter according to claim 1, wherein when the balloon is in the deflated state, the shortest distance between the predetermined reference axis and the plurality of hard members is shorter than the shortest distance between the predetermined reference axis and a midpoint in the circumferential direction of each of the at least one joining portions.

9. The balloon body for the catheter according to claim 1, wherein a length in the circumferential direction of the plurality of rigid portions and each of the at least one joining portions is the same, and the plurality of hard members, the plurality of rigid portions, and the at least one joining portions are made of the same material.

10. A balloon catheter comprising:

a balloon body for a catheter provided with a balloon configured to change shape between a deflated state and an inflated state, and a plurality of hard members which are positioned on a side surface of the balloon and protrude outward, the balloon including a plurality of rigid portions, each of the plurality of rigid portions having at least one joining portion provided with each of the plurality of hard members, and a plurality of flexible portions which are arranged between the plurality of rigid portions in a circumferential direction and a rigidity of the plurality of flexible portions are smaller than that of the plurality of rigid portions, the balloon is configured to change shape such that each of the plurality of hard members moves in a direction away from a predetermined reference axis when the balloon switches from the deflated state to the inflated state, and is configured to change shape such that each of the plurality of hard members moves in a direction closer to the predetermined reference axis when the balloon switches from the inflated state to the deflated state, the plurality of hard members being harder than the plurality of flexible portions of the balloon, and in a cross section orthogonal to the predetermined reference axis, at least a portion of each of the plurality of hard members that are protruding outward with respect to the balloon provided on the balloon in the deflated state, being arranged in a virtual closed region, the virtual closed region being formed when an end portion in the circumferential direction of each of the plurality of rigid portions is joined to an end portion in the circumferential direction of another rigid portion adjacent in the circumferential direction, the predetermined reference axis being arranged at a center of the virtual closed region, and a long member extending along the predetermined reference axis and inserted through the balloon, wherein when the balloon is in the deflated state, each of the plurality of rigid portions contacts the long member.

* * * * *